June 16, 1964  H. E. HOBE  3,137,359
STRAIN GAUGE WEIGHING APPARATUS
Filed May 21, 1962
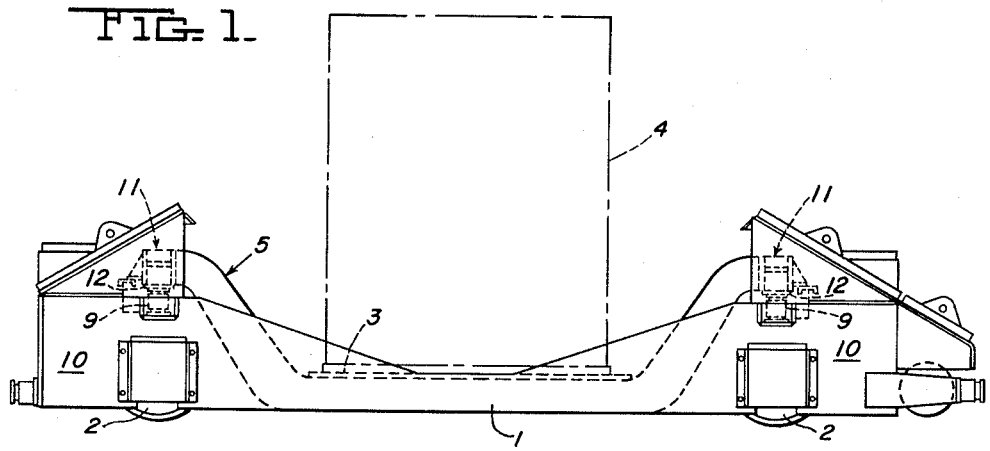
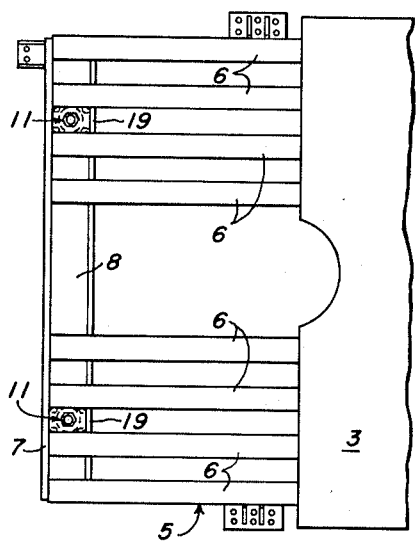
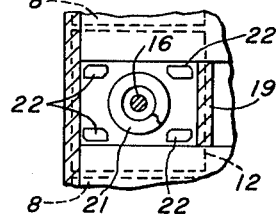
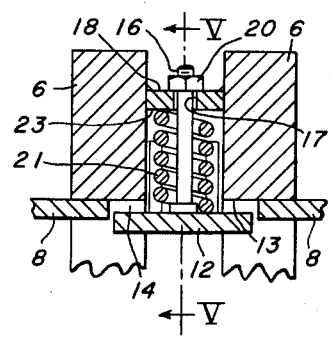
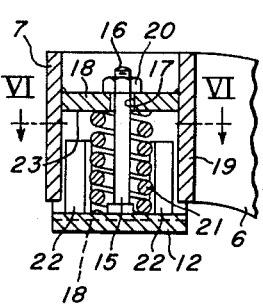
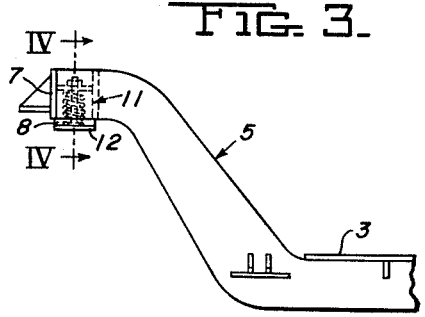
INVENTOR.
HAROLD E. HOBE
By Donald G. Dalton
Attorney

United States Patent Office 3,137,359
Patented June 16, 1964

3,137,359
STRAIN GAUGE WEIGHING APPARATUS
Harold E. Hobe, Johnstown, Pa., assignor to United States Steel Corporation, a corporation of New Jersey
Filed May 21, 1962, Ser. No. 196,235
8 Claims. (Cl. 177—136)

This invention relates to weighing apparatus of the type in which the weight measurement is performed electrically by a plurality of strain gauges in the form of compression cells. It resides more particularly in the supporting structure through which the load to be weighed is applied to the compression cells, and is directed to improvements that operate to maintain each of the cells under a compression load that is above a predetermined minimum. While the invention is applicable generally to strain gauge weighing apparatus, it is especially suited for mobile weighing apparatus such as railway cars used in steel mill operations for the transfer of hot metal ladles or scrap buckets.

In steel mill transfer cars equipped with weighing apparatus, a ladle or scrap bucket is carried by a platform or cradle that extends longitudinally of the car chassis and is supported thereon by pairs of compression cells arranged in laterally spaced positions at opposite ends of the car chassis. The compression cells are connected in a balanced bridge circuit that for accurate weight indicating operation requires maintenance of each of the cells under a compression above a predetermined minimum. For example, cells having a capacity of 200,000 pounds must be maintained under a minimum compression of approximately 2,000 pounds. While this can be done readily under static conditions with the car resting on a level trackway, it frequently is not possible when the trackway rails are not level or when the load is unevenly distributed on the car platform. In such case, distortion of the car chassis or the car platform by twisting may unload one of the cells to an extent such that an inaccurate weight indication is had. The elimination of inaccurate weight indications of this character constitutes one of the principal objects of this invention.

A further object as indicated above is to provide an improved supporting structure for the load carrying platform on the compression cells that operates to maintain the compression on each cell above a predetermined minimum. The provision of extensible units for this purpose and which respectively include a resiliently spring-biased force transmitting member in bearing engagement with one of the compression cells is a further and related object of the invention.

Other objects and advantages of the invention will become apparent from the following description and the accompanying drawings, in which:

FIGURE 1 is a side elevational view of a railway car for transporting hot metal ladles, scrap buckets and the like that is equipped with strain gauges for weighing the load carried by the car;

FIGURE 2 is a plan view on an enlarged scale of one end of the load carrying platform that forms part of the transfer car shown in FIGURE 1;

FIGURE 3 is a side elevational view of the platform end shown in FIGURE 2;

FIGURE 4 is an enlarged sectional view taken substantially in the plane of line IV—IV of FIGURE 3;

FIGURE 5 is a sectional view taken substantially along the line V—V of FIGURE 4; and FIGURE 6 is a view taken substantially along the line VI—VI of FIGURE 5.

As indicated, this invention is particularly adapted for railway transfer cars of the type commonly used for the transportation of hot metal ladles and scrap buckets in steel mill operations. As shown in FIGURE 1 of the drawings, such cars comprise a chassis 1 that is provided with flanged wheels 2 at opposite ends thereof for movement over railway rails and a horizontal platform 3 for supporting a load to be transported. The load on the platform 3 may be a hot metal ladle 4, the contour of which is shown in dotted lines in FIGURE 1, or a bucket for scrap or other materials used in steel mill operations. A cradle 5 supports the platform 3 on the chassis 1 and, as best shown in FIGURES 2 and 3, is constructed of parallel beams 6. At each end of the cradle 5, a vertical end plate 7 and a horizontal bottom plate 8 extend transversely of and are welded to the beams 6. The cradle 5 is supported on the chassis 1 by compression cells 9 arranged in pairs and occupying laterally disposed positions on opposite ends 10 of the chassis 1.

The compression cells 9 are conventional electrical strain gauge units that may be obtained on the market from a number of different suppliers. More specifically, they are of the type commonly referred to by the term "SR–4 load cells" that are constructed, for example, as shown in Bulletin 4301 of the Baldwin-Lima-Hamilton Corporation, Philadelphia, Pa. The cells 9 are connected in a bridge circuit (not shown) as also shown and described in this publication that operates to furnish an indication of the load to which the cells 9 are cumulatively subject.

In conventional car constructions of the type described above, the horizontal bottom plates 8 at the ends of the cradle 5 have supporting engagement on the compression cells 9 so that the bridge circuit in which they are connected operates to furnish an indication of the load carried by the platform 3. As further indicated above, the weight indication provided by an arrangement of this character is accurate as long as the weight of the platform and the load carried thereby is distributed evenly between the compression cells 9 and each of such cells is under a compression loading that is above a predetermined minimum of, for example, approximately 2,000 pounds for cells having a capacity of 200,000 pounds. However, inaccurate weight indications are had when the compression loading on one of the cells 9 falls below this predetermined minimum. This condition is frequently encountered when the chassis wheels 2 are resting on trackway rails that are not level and consequent twisting movement of the chassis 1 causes relative vertical movement between one corner of the platform 3 and the chassis 1. Relative movement of this character may operate to unload one of the compression cells 9 to a point below the predetermined minimum that is required for an accurate weight indicating operation. A similar condition may be had when unequal distribution of the load on the platform 3 causes distortion of the cradle 5.

To eliminate inaccurate weight indications of the character mentioned above, this invention provides a plurality of resiliently extensible units 11 for supporting the cradle 5 on the load cells 9. As shown in FIGURE 2, the units 11 are arranged in pairs on each end of the cradle 5 and at the corners thereof in laterally disposed positions corresponding to the spacing of the compression cells 9 on the chassis ends 10 with which they are associated. As shown in FIGURES 3–6, each of the units 11 comprises a force transmitting member or plate 12 that is adapted to have bearing engagement on the upper end of one of the compression cells 9. The plate 12 is mounted for limited vertical movement relative to the cradle beams 6 from the lower position shown in FIGURES 4 and 5 to an upper position in abutting engagement with the beam bottom surfaces 13. In order that the plate 12 may engage the surfaces 13, a portion of the transverse plate 8 that is continuous in conventional constructions is cut away to provide an opening 14 through which the plate 12 may move vertically into abutting engagement with the beam surfaces 13. The mounting for vertical movement of each plate 12 on the cradle 5 comprises a vertical pin 15 that has a welded connection at its lower end with the plate 12 at a point centrally thereof and its upper end 16 projecting through an opening 17 in a horizontal plate 18 that is arranged in the space between and has welded connections with adjacent cradle beams 6. The plate 18 also has welded connections with the vertical end plate 7 and with a stiffener plate 19 that extends between adjacent beams 6. A nut 20 threaded on the upper end 16 of the pin 15 limits downward movement of the pin 15 in the opening 17 and thus controls the lower position of the plate 12. A coil spring 21 is arranged concentrically with respect to the pin 15 and has its lower end engaged with the force transmitting plate 12 and its upper end engaged with the plate 18.

The vertical travel of the plate 12 in the opening 14 is less than the thickness of the cradle plate 8 so that adjacent edges of the plates 8 and 12 operate to guide the vertical movement of the plate 12. A further guiding action is provided by movement of the stem 15 in the plate opening 17 and by guide bars 22 projecting upwardly from the corners of the plate 12. These parts, in addition to guiding the vertical movement of the plate 12, operate to restrain it when it is not in abutting engagement with the surfaces 13 against horizontal vibrating movement that might otherwise damage the cell 9 on which it is supported.

When the cradle 5 is assembled on the car chassis 1, the force transmitting members 12 have supporting engagement on the upper ends of the compression cells 9 and move upwardly against the action of the springs 21 to positions in which they engage the bottom surfaces 13 on the cradle beams 6. This movement compresses the springs 20 and the resulting compression provides a resilient biasing force that maintains each of the cells 9 under a compression loading when vertical movement of the plates 12 relative to the cradle 5 thereafter takes place. As long as there is no relative movement between the cradle 5 and the chassis 1, the weight of the cradle and the load carried thereby is transmitted directly through the plates 12 to the compression cells because of the abutting engagement of the plates 12 with the bottom surfaces 13 of the cradle beams 6. Upon distortion of the chassis 1 by uneven trackway rails, or twisting of the cradle 5 by an uneven distribution of the weight of a load thereon, one of the corners of the cradle 5 may move vertically relative to the compression cell on which it is supported. When vertical movement of this character takes place at one of the cradle corners, the resilience of the springs 21 operates to move the plate 12 downwardly to maintain it engaged with the compression cell 9, which is thus maintained under a compression that is above the minimum at which inaccurate weight indications will be had.

The size and compressive strength of the springs 21 are determined by the maximum vertical movement of the cradle corners relative to cells 9 and the compressive loading to be maintained thereon. Generally stated, each spring 21 has a free length that is at least equal to the distance between the plates 12 and 18 in the relative positions shown in FIGURES 4 and 5, and the gap between the plate 12 and the beam surfaces 13 is greater than the maximum relative movement that will take place between the corners of the cradle 5 and the cells 9, so that the springs 21 will not expand to their full length when such maximum relative movement takes place. In addition, the compressive strength of the springs 21 is such that they operate to maintain the cells 9 under a compression loading that is above a predetermined minimum when such maximum vertical travel between the cradle 5 and the chassis 1 takes place. For example, in a transfer car 1 having a platform 5 that weighs approximately 57,750 pounds and in which the maximum relative vertical travel of its corners with respect to the chassis 1 is approximately ¾ of an inch, springs 21 that had a strength of approximately 9,400 pounds per inch deflection and a free or uncompressed length 1 inch longer than the distance between the beam surfaces 13 and the bottom surface 23 of the plate 18 were used. With no pre-compression on the springs 21, this provided a gap of 1 inch between each plate 12 and the beam surfaces 13 in the position shown in FIGURES 4 and 5 of the drawings. Upon assembly of the cradle 5 on the cells 9 as described above, the plates 12 move into abutting engagement with the beam bottom surfaces 13 and the springs 21 are compressed and each subjected to a load of 9,400 pounds. This spring loading provides a downward bias that operates to maintain each plate 12 engaged with the cell 9 positioned below it and, since the relative vertical movement of the cradle corners for the example given never exceeds ¾ of an inch, the load on each compression cell 9 is always in excess of 2,350 pounds, which is above the minimum of approximately 2,000 pounds at which inaccurate weight indications would be had.

In the event that maintenance of a greater minimum compression on the cells 9 is desired, this may be accomplished by using springs 21 either of greater compressive strength or springs having a longer axial length. If longer springs are employed, then they must be pre-compressed by tightening the nuts 20 to move the plates 12 to the lower position shown in the drawings.

While one embodiment of my invention has been shown and described it will be apparent that other adaptations and modifications may be made without departing from the scope of the following claims.

I claim:

1. In a mobile weighing apparatus of the type comprising a chassis, a load carrying platform, and means including a plurality of compression cells on said chassis for supporting said platform and for weighing the load carried thereby, the combination therewith of means for supporting said platform on said cells and for maintaining each of said cells under a compression above a predetermined minimum upon movement of said platform relative thereto.

2. In a mobile weighing apparatus of the type comprising a chassis, a load carrying platform, and means including a plurality of compression cells on said chassis for supporting said platform and for weighing the load carried thereby, the invention which comprises a plurality of resiliently extensible units for supporting said platform on said cells, said units being associated respectively with different ones of said cells and being effective to maintain the compression of the cell with which it is associated above a predetermined minimum upon vertical movement of said platform relative thereto.

3. In a mobile weighing apparatus of the type comprising a chassis, a load carrying platform, and means including a plurality of compression cells on said chassis for supporting said platform and for weighing the load carried thereby, the invention which comprises a plurality of resiliently extensible units for distributing the weight of said platform and load on said cells, each of said units comprising a force transmitting member in bearing engagement on the upper end of one of said cells and movable vertically to and from a position in which it has abutting engagement with said platform, and a biasing spring for maintaining said member engaged with said one cell and operating to maintain said one cell under a compression above a predetermined minimum upon vertical movement of said platform in a direction away from said one cell, said biasing springs under normal operating conditions being completely compressed with said transmitting members in abutting engagement with said platform.

4. In load weighing apparatus that includes a load carrying support and a compression cell for weighing said support and the load carried thereby, the combination comprising a force transmitting member in bearing engagement with the upper end of said cell and movable vertically to and from a position in abutting engagement with said support, a coil spring extending between said support and said member, said spring being effective to maintain said member engaged with said cell and to maintain said cell under a compression above a predetermined minimum upon vertical movement of said support in a direction away from said cell.

5. In load weighing apparatus that includes a load carrying support and a compression cell for weighing said support and the load carried thereby, the combination comprising a force transmitting member in bearing engagement with the upper end of said cell and movable vertically to and from a position in abutting engagement with said support, a coil spring arranged above said member with its lower end engaged therewith, an anchoring plate for the upper end of said spring secured to said support, said spring being compressible for movement of said member to said support abutting position by the weight of said support and the load carried thereby, said spring further operating to maintain said member engaged with said cell and to maintain said cell under a compression above a predetermined minimum upon vertical movement of said support in a direction away from said cell.

6. An apparatus as defined in claim 5 characterized by means limiting the movement of said member in a direction away from its said support abutting position comprising a vertical stem secured to said member and projecting axially upwardly through said coil, said anchoring plate having an opening through which said stem projects, and a nut on the upper end of said stem for engaging said plate to limit vertical downward movement of said member by said spring.

7. An apparatus as defined in claim 6 characterized by said nut operating to control the effective length of said stem and thereby the compression of said spring when said member is disengaged from said cell.

8. An apparatus as defined in claim 5 characterized by said support having an opening below said plate in which the upper end of said spring extends, and by said member having a plurality of guide bars projecting upwardly therefrom into said opening for guiding the vertical movement of said member relative to said support.

References Cited in the file of this patent
UNITED STATES PATENTS

| | | |
|---|---|---|
| 2,523,413 | Bohannan | Sept. 26, 1950 |
| 2,523,429 | Hart et al. | Sept. 26, 1950 |
| 2,689,120 | Reussenzehn | Sept. 14, 1954 |